(12) United States Patent
Hoeijmakers (10) Patent No.: US 7,164,219 B2
(45) Date of Patent: Jan. 16, 2007

(54) ELECTROMECHANICAL CONVERTER

(75) Inventor: Martin Jacobus Hoeijmakers, Delft (NL)

(73) Assignee: Nederlandse Organisatie voor Toegepastnatuurwetenschappelijk Onderzoek TNO (NL)

( * ) Notice: Subject to any disclaimer, the term of this patent is extended or adjusted under 35 U.S.C. 154(b) by 0 days.

(21) Appl. No.: 10/506,393

(22) PCT Filed: Feb. 28, 2003

(86) PCT No.: PCT/NL03/00155

§ 371 (c)(1),
(2), (4) Date: Nov. 18, 2004

(87) PCT Pub. No.: WO03/075437

PCT Pub. Date: Sep. 12, 2003

(65) Prior Publication Data

US 2005/0077800 A1    Apr. 14, 2005

(30) Foreign Application Priority Data

Mar. 1, 2002    (NL) .................................... 1020095

(51) Int. Cl.
*H02K 1/22* (2006.01)
(52) U.S. Cl. .................................... 310/266
(58) Field of Classification Search ............... 310/266, 310/112, 113, 114, 166
See application file for complete search history.

(56) References Cited

U.S. PATENT DOCUMENTS

| 3,683,249 | A | | 8/1972 | Shibata |
| 3,789,281 | A | * | 1/1974 | Shibata ........................ 318/696 |
| 4,532,447 | A | * | 7/1985 | Cibie ......................... 310/114 |
| 5,917,248 | A | * | 6/1999 | Seguchi et al. ............... 290/31 |

FOREIGN PATENT DOCUMENTS

| DE | 19548117 A1 | 8/1996 |
| WO | WO 00/34066 | 6/2000 |

\* cited by examiner

*Primary Examiner*—Darren Schuberg
*Assistant Examiner*—Nguyen Hanh
(74) *Attorney, Agent, or Firm*—Swanson & Bratschun, LLC (57) ABSTRACT

An electromechanical converter, in particular an electric variable transmission, is provided with a primary shaft (5) having a rotor (8) mounted thereon, a secondary shaft (7) having an interrotor (15) mounted thereon, and a stator (10), fixedly mounted to the housing (3) of the electromechanical converter. Viewed from the primary shaft (5) in radial direction, the rotor (8), the interrotor (15) and the stator (10) are arranged concentrically relative to each other. The rotor (8) and the stator (10) are designed with one or more mono- or polyphase, electrically accessible windings. The interrotor (15) forms one whole both mechanically and electromagnetically, and is arranged as a conductor for the magnetic flux in an at least tangential direction.

9 Claims, 5 Drawing Sheets

Fig. 1

Prior Art

Fig. 2

Prior Art

Fig. 6

ELECTROMECHANICAL CONVERTER

RELATED APPLICATION DATA

This application is a 35 USC §371 National Phase Application of International Application Serial Number PCT/NL03/00155 (WO 03/075437A1) entitled ELECTROMECHANICAL CONVERTER, filed Feb. 28, 2003, which application claims priority to Netherlands Patent Application Serial Number NL1020095 entitled ELECTROMECHANICAL CONVERTER, filed Mar. 1, 2002, which applications are hereby incorporated in their entirety by reference.

TECHNICAL FIELD

The present invention relates to an electromechanical converter, in particular an electric variable transmission, provided with a primary shaft having a rotor mounted thereon, a secondary shaft having an interrotor mounted thereon, and a stator, fixedly mounted to the housing of the electromechanical converter, wherein, viewed from the primary shaft in radial direction, the rotor, the interrotor and the stator are arranged concentrically relative to each other, and wherein the rotor and the stator are designed with one or more mono- or polyphase, electrically accessible windings. A part of the power supplied via the primary shaft can be passed directly in an electromagnetic manner to the interrotor on the secondary shaft, while another part can be drawn, using, for instance, slip rings, from the primary shaft and via power electronic converters be supplied to the stator. Furthermore, the power transport direction can be reversed and the output speed can be both higher and lower than the input speed. These speeds can also change in sign.

BACKGROUND ART

Such electromechanical converters are known, inter alia from the international patent application WO 00/34066, from U.S. patent specification U.S. Pat. No. 3,683,249 and from the European patent application EP-A-0 866 544. They can be applied in the form of an electric variable transmission (EVT), not only in a variety of road vehicles, in particular local buses, but also in rail vehicles such as diesel trains, and in vessels.

More particularly, WO 00/34066 describes a hybrid drive with an electromechanical transmission, comprising a stator which surrounds two concentrically arranged rotors, while the rotors are mechanically coupled to an IC engine and a drive train, respectively. The outer rotor, which is arranged between the inner rotor and the stator, is referred to as interrotor in the context of this application. Rotor-interrotor and interrotor-stator in WO 00/34066 form two mechanically integrated electric machines that can both be of either the synchronous or the asynchronous type. The flux transfer between both the rotor-interrotor and the interrotor-stator is radial or axial. The electric machines are electromagnetically separated: there is no flux transfer from the rotor via the interrotor to the stator or vice versa. The interrotor is built up from mechanically coupled, but electromagnetically separated parts. The electric machines of the electromechanical transmission are each controlled with individual control means.

The electric variable transmission (EVT) is an electromechanical converter with two mechanical ports, viz. a primary (driving) shaft and a secondary (driven) shaft, and an electric gate via which energy can be exchanged. If the electric gate is not used, the EVT works as a common infinitely variable transmission, where the transfer ratio has a very wide range. The EVT fulfills a function that is comparable to that of a combination of a clutch and a gearbox of a vehicle. In combination with the EVT, the combustion engine in fact works as a power source, whereby the speed can be set according to an optimum characteristic of the engine. The fuel consumption, the noise level and the emission of noxious gases from the vehicle can thus be reduced. Because the EVT is an infinitely variable transmission, there are no gearshifting shocks during acceleration. It also means that always acceleration with a constant (maximally permissible) power is possible, and not, as in a conventional gearbox, with a more or less sawtooth-shaped course of the power as a function of the time. With the same engine, the acceleration with an EVT therefore proceeds faster than with a conventional gearbox.

The EVT can work as a substantially wear-free starter motor by connecting the electric gate to an on-board battery. As a consequence, local buses equipped with an EVT, can, for instance, switch off their engine at bus stops without any objection, which is more comfortable and moreover leads to a substantial saving of fuel, since frequent starting entails undue wear of the starter motor and the starter ring in conventional starter motors.

Via the electric gate, via a power electronic converter, the on-board network can be supplied and hence the on-board battery can be charged. Thus, a substantially wear-free dynamo has been obtained. Since conventional dynamos have a poor efficiency, this also leads to a minor saving of fuel. In an electric system with a common dynamo, the power is practically limited by the belt drive and the low on-board voltage. In the use of the EVT, via power electronic converters, higher voltage levels can be simply created and the power is limited only by the diesel engine. This means that some auxiliary provisions that are now driven directly by the engine, such as, for instance, the pump for the power steering, or the compressor in buses, can be driven electrically with a high efficiency. They can then be switched on and off at will, so that the no-load losses are less. This also leads to fuel saving.

With the EVT, it is simply possible to brake by way of the motor. The braking power can then be increased by increasing the speed of the engine. However, this is accompanied by an increased noise production. In addition, it is possible to dissipate the brake energy in resistances that are connected to the electric gate. This makes it possible to brake to a halt, this in contrast, for instance, to a conventional retarder in buses. When braking, possibly, the motor can even be switched off, so that the fuel consumption is reduced and the engine does not produce any noise.

To the electric gate, a buffer in the form of a battery or a flywheel system can be connected. With these, brake energy can be stored, which can subsequently be used again for acceleration. This relatively costly extension can, particularly with local buses, yield a substantial saving of fuel.

The electric gate makes the converter particularly suitable for use in hybrid vehicles; the mechanical energy for the cardan shaft can be produced both by the IC engine and by an electric source.

The most important disadvantage of the existing EVT is its mass. It is significantly greater than that of a conventional gearbox. In addition, the existing EVT is also more expensive than a conventional gearbox.

As has already been mentioned, an electromechanical converter, as is described in the opening paragraph, is known from the European patent EP-A-0 866 544. The electromechanical converter described therein, however, has as a drawback that the interrotor is formed by two rotor parts which are mechanically connected with each other, but are electromagnetically separated from each other, so that the rotor with the one rotor part forms a first machine and the other rotor part with the stator forms a second machine working independently of the first. Although as a result the advantage is obtained that the magnetic flux in the two machines can be separately controlled, it is a serious drawback that as a result of this structure the electromechanical converter is large and heavy.

SUMMARY OF THE INVENTION

To remedy this disadvantage, the electromechanical converter, such as it is described in the opening paragraph, is characterized in that the interrotor forms one whole both mechanically and electromagnetically and is arranged as a conductor for the magnetic flux in an at least tangential direction. In other words, compared with the electromechanical converter in the European patent application EP-A-0 866 544, the two rotor parts have been electromagnetically coupled and further been integrated into one whole, so that a desired volume and weight saving is rendered possible. In the electromechanical converter according to the invention, of course, a magnetic flux conduction in radial direction remains present.

The parts of the electric machine are electromagnetically coupled: flux transfer can take place from the rotor via the interrotor to the stator and vice versa. The machine forms one whole both mechanically and electromagnetically. The parts of the electromagnetic transmission are controlled by a single control device.

Although it is known from the European patent application EP-A-1 154 551 to make use of an interrotor forming one whole, the interrotor described therein is solely and exclusively suitable to serve as a magnetic flux conductor in the radial direction. To that end, the interrotor described in this European patent application is built up from a tubular unit having a relatively thin wall, while, viewed in tangential direction, flux conductor material is each time alternated with material, in particular copper, that does not, at least to an extremely minor extent, conduct the magnetic flux. Owing to the feature according to the invention that the interrotor forms not only a conductor for the magnetic flux in the radial direction but also in the tangential direction, it is rendered possible, as will be further elucidated hereinafter, to use flux attenuation in one part of the electromechanical converter, while this is not done in the other part.

The interrotor consists of an electric and a magnetic circuit. In a first embodiment according to the invention, the magnetic circuit is formed by a cylindrical yoke which is provided on the radial inner and outer side with teeth between which longitudinally extending grooves are situated in which extend shortcircuit windings forming the electric circuit. In a second embodiment, the interrotor is formed by a magnetic flux conducting cylindrical yoke, while on the radial inner and outer side permanently magnetic material, for instance in the form of blocks, is arranged. In a third embodiment, the interrotor is formed by a magnetic flux conducting cylindrical yoke, while on the one side permanently magnetic material is provided and on the other side longitudinally extending grooves are arranged in which an electrically accessible winding is provided.

Preferably, the magnetic flux conducting circuit of the interrotor, in particular the yoke with teeth between which grooves are located, has a substantially smooth surface on the radial inner side and/or the radial outer side of the interrotor. In particular, the radial inner and/or outer side of the magnetic flux conducting material of the circuit are parts reaching outwards freely with respect to the contour of the circuit. What is thus achieved is that salient poles are absent which impose a predetermined fixed pattern of magnetic poles on the magnetic flux conducting material of the interrotor, so that the pattern of magnetic poles in the magnetic flux conducting material of the interrotor is free and can be varied during operation. It is noted that in this context a substantially smooth surface is understood to mean not only a completely smooth surface, but can also comprise a surface having, with respect to a smooth, for instance circular cylindrical contour, grooves (slots) directed radially inwards with respect to the circuit. Such recesses then comprise less than half of the total circumference of, respectively, the radial inner or outer side of the circuit, preferably less than about 20–30% of the circumference.

The stator winding and rotor winding can be interconnected via one or more power electronic converters. As a result, a transfer of electrical energy from the rotor to the stator, for instance when a vehicle drives off, or vice versa, for instance during overdrive, is possible. In a particular case, these one or more power electronic converters can be electrically accessible via a single electric gate, for instance to be able to connect an on-board battery to it, so that with the aid of the EVT a substantially wear-free starter motor can be obtained. Conversely, from the EVT, via this electric gate, the on-board battery can be charged, so that a substantially wear-free dynamo is obtained. In another embodiment, the stator winding and rotor winding can each separately be electrically accessible via power electronic converters, via an electric gate. In such a case, it is possible that when the vehicle is at a standstill and only the combustion engine is active, the rotor-interrotor combination can work as a generator for, for instance, a cooling installation in the vehicle. Also, it is then possible to use the interrotor-stator combination as a motor, for instance in hybrid vehicles, in which case the rotor-interrotor combination is not used.

The input shaft and the output shaft can optionally, for instance by means of a claw or friction clutch, be interconnected mechanically to form a so-called lock-up position, in which direct mechanical force transmission takes place between input and output shaft.

The invention not only relates to an electromechanical converter, but also to an apparatus provided with an electromechanical converter as described above for starting a driving combustion engine or for supplying electrical equipment, and to an apparatus provided with an electromechanical converter as described above and provided with a system for the storage of energy.

BRIEF DESCRIPTION OF THE DRAWINGS

The invention will now be further elucidated on the basis of an exemplary embodiment, as represented in the accompanying drawing, wherein.

DETAILED DESCRIPTION OF THE INVENTION

The electric variable transmission (EVT) is an electromechanical converter with two mechanical gates and one electric gate. The EVT is primarily an infinitely variable transmission, while moreover via the electric gate energy can be exchanged. In the following description of the figures, initially the electric gate will be disregarded.

Figure 1:
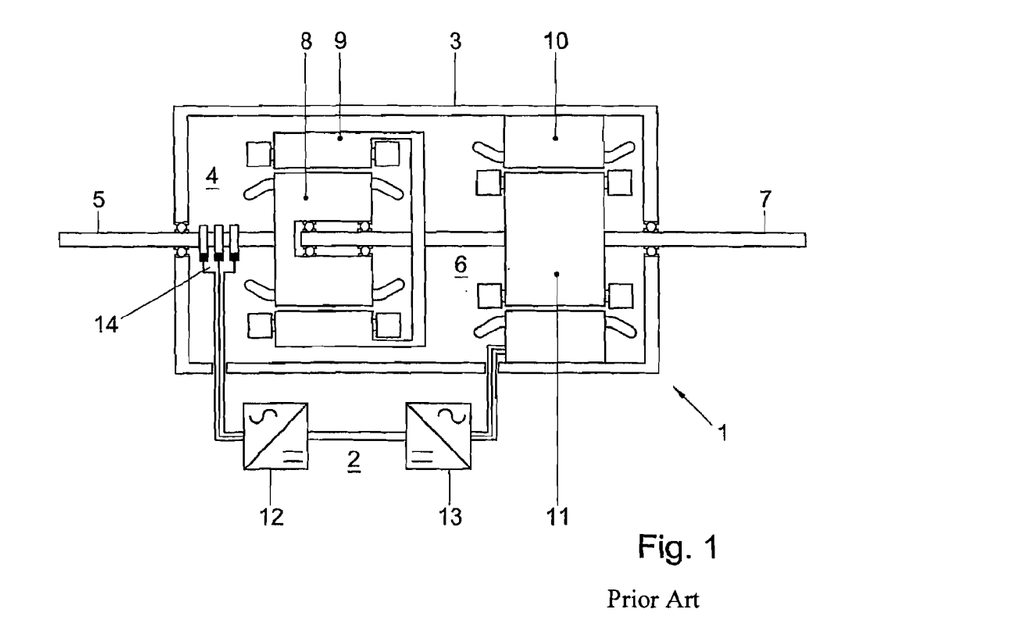
FIG. 1 schematically shows the basic structure of an electric variable transmission according to the prior art.

The basic structure of an EVT is schematically represented in FIG. 1 and is known from the European patent application EP-A-0 866 533. This EVT is built up from an electromechanical part 1 and a power electronic part 2. The electromechanical part 1 comprises a housing 3 in which a primary induction machine 4 with a primary shaft 5 and a secondary induction machine 6 with a secondary shaft 7 are arranged. The two shafts 5 and 7 are bearing-mounted in the housing 3. The primary induction machine 4 consists in this embodiment of a rotor 8 formed by a slip ring armature with an electrically accessible polyphase winding, and a non-electrically accessible cage armature 9. The secondary induction machine 6 consists of a stationary part, the stator 10, fixedly connected with the housing 3, and a cage armature 11 mounted on the secondary shaft 7. The secondary shaft 7 of the secondary induction machine 6 is also bearing mounted in the rotor 8. The stator 10 has an electrically accessible polyphase winding. Between the rotor 8 and the stator 10, electric energy can be exchanged via the power electronic part 2, which here comprises a power electronic converter 12 and a power electronic converter 13, which are both designed as an alternating voltage-direct voltage inverter. The two inverters are connected with each other at the direct voltage side. The basis of the EVT according to the invention is the primary induction machine 3 which works as a kind of electromagnetic clutch. The secondary machine works as an auxiliary motor with generator.

To elucidate the operation of this known EVT in a simple manner, let it be assumed that no losses occur therein. First, it is assumed that the slip ring armature 8 is supplied from a direct voltage source then formed by the primary voltage inverter 12, and that the secondary shaft 7 rotates with approximately the same speed as the primary shaft 5. The rotary field in the first induction machine 4 then rotates synchronously with the slip ring armature 8. The secondary induction machine 6 is not active yet. As a result of a speed difference between the primary shaft 5 and the primary cage armature 9, and hence the secondary shaft 7, a magnetic rotary field is created and an electric current is induced in the primary cage armature 9, so that an electromagnetic torque is created, whereby the torque of the primary shaft is transferred to the secondary shaft, with only a minor slip loss. The direct voltage source only provides power for dissipation in the resistance of the rotary current winding of the slip ring armature 8, which is further neglected.

In normal operation, the primary voltage converter will not deliver direct voltage but alternating voltage, and via the power electronic part 2 energy exchange takes place.

Neglecting the slip angular speed of the cage armature 9, what applies in a stationary condition, that is, in a condition with torque equilibrium, is that $T_1=T_{c1}$, wherein $T_1$ is the torque exerted on the primary shaft 5 by, for instance, a combustion engine, and $T_{c1}$ is the torque that is exerted via the electromagnetic field by the slip ring armature 8 on the cage armature 9 of the primary induction machine 4. What can be written for the mechanical powers is: $P_{m1}=\omega_{m1}T_1$ and $P_{m12}=\omega_{m2}T_{c1}=\omega_{m2}T_1$, wherein $P_{m1}$ is the mechanical power that is supplied via the primary shaft 5, $\omega_{m1}$ is the angular speed of the primary shaft 5, $P_{m12}$ is the mechanical power that is delivered to the secondary induction machine 6, and $\omega_{m2}$ is the angular speed of the secondary shaft 7. The difference of these two powers $P_e=(\omega_{m1}-\omega_{m2})T_1$ is removed via a combination 14 of slip rings and brushes being in contact therewith, and the power electronic part 2. Here, $(\omega_{m1}-\omega_{m2})$ represents the speed of the rotary field with respect to the slip ring armature 8; this speed, together with the air gap torque, is determinative of the power that is converted via the rotary current winding. If the secondary shaft 7 rotates with a lower speed (including standstill) than the primary shaft 5, that is, $\omega_{m1}>\omega_{m2}$, then the slip ring armature 8 delivers electric power via said combination 14 of slip rings and brushes being in contact therewith. In the case where $\omega_{m1}<\omega_{m2}$ (overdrive in road vehicles), conversely, electric power needs to be supplied to the slip ring armature 8.

It is now further assumed that $\omega_{m1}>\omega_{m2}$. The slip ring armature 8 then delivers electric power. This electric power is supplied with the aid of the voltage inverters 12 and 13 via a power electronic conversion process to the secondary induction machine 6. Let is be assumed that this conversion process is also free of loss and that no slip angular speed and other losses occur, so that the complete electrically supplied power is converted into mechanical power. What then applies for the torque that is exerted on the secondary rotor is: $T_{c2}=P_e/\omega_{m2}=(\omega_{m1}-\omega_{m2})T_1/\omega_{m2}$. The torque exerted by the secondary shaft, for instance on a mechanical load, is the sum of the primary torque and the torque that is exerted on the secondary rotor: $T_2=T_1+T_{c2}=\omega_{m1}T_1/\omega_{m2}$. In this case $(\omega_{m1}>\omega_{m2})$ the output torque is greater than the input torque.

In the case where the secondary shaft rotates with a higher speed than the primary shaft $(\omega_{m1}<\omega_{m2})$, the above equations simply remain valid. In that case, however, via the combination 14 of slip rings and brushes being in contact therewith, electric power must be supplied to the primary induction machine 4 ($P_e<0$). This power is furnished by the secondary induction machine 6, which then works as a generator. In this operative condition, the torque that is exerted on the rotor 11 of the secondary induction machine 6 is negative ($T_{c2<0}$) and $T_2$ will be less than $T_1$.

Figure 2:
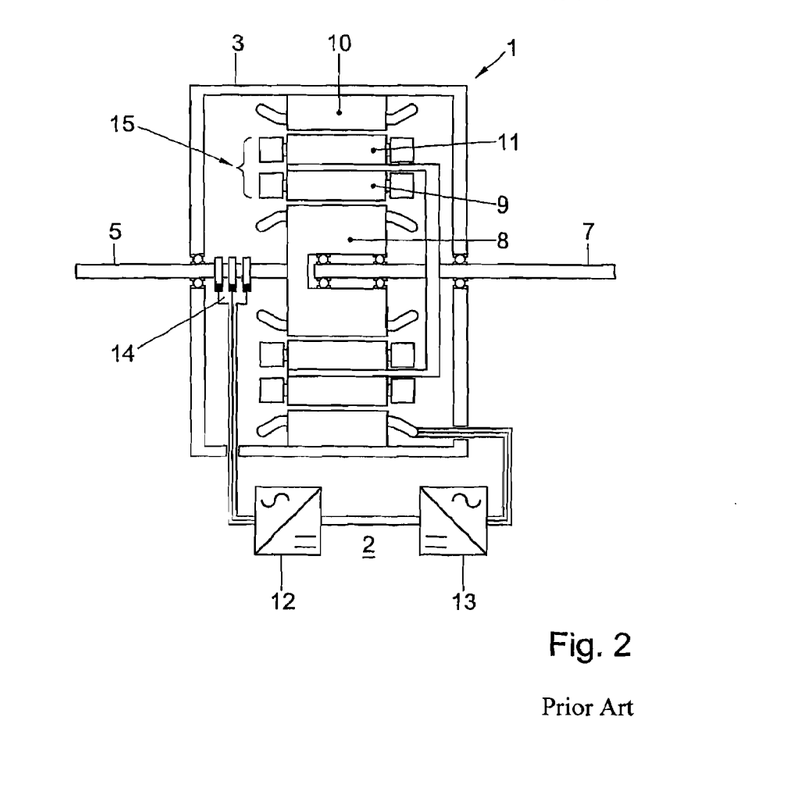
FIG. 2 schematically shows a more practical structure of such an electric variable transmission.
Figure 3:
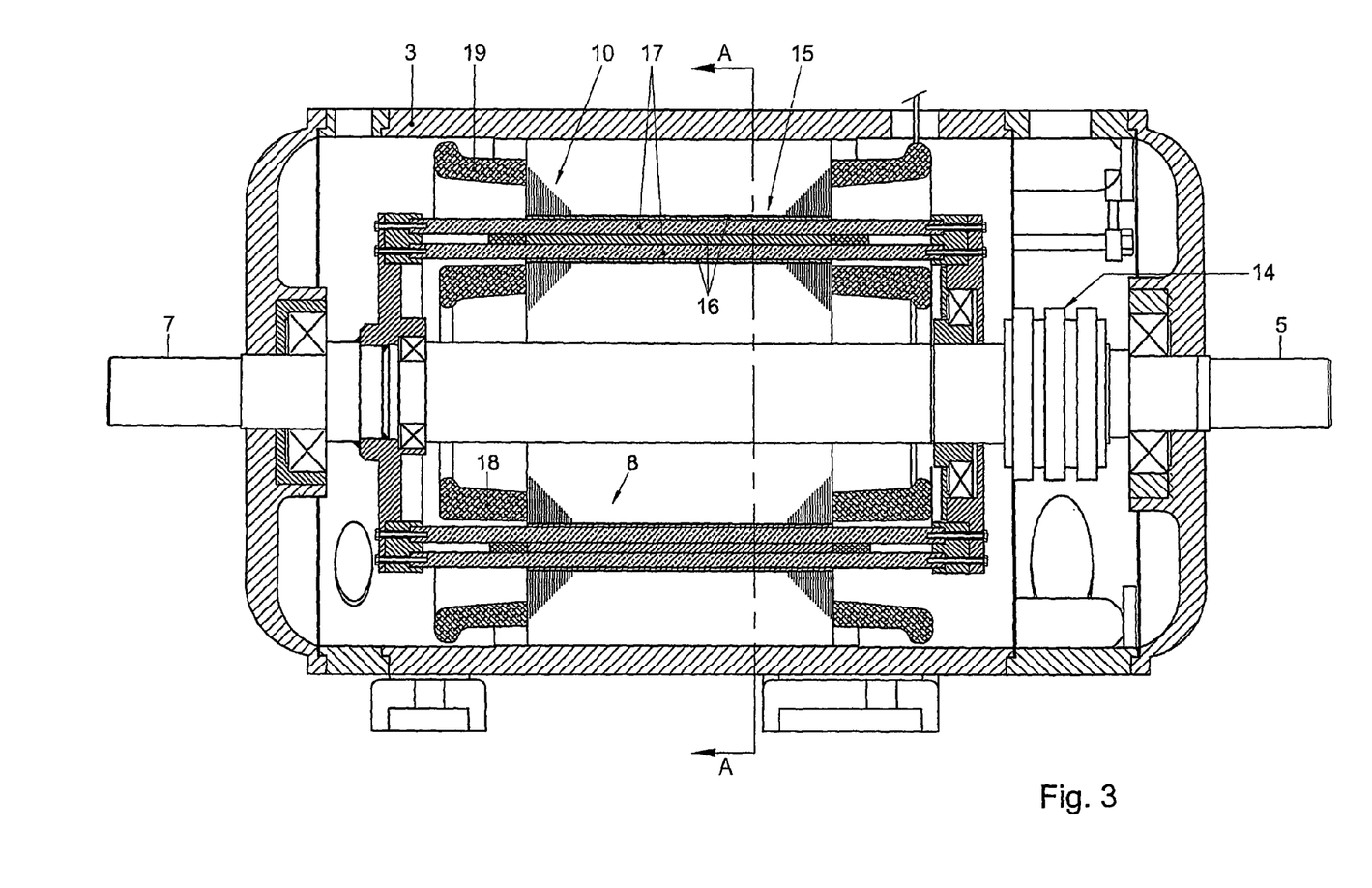
FIG. 3 shows in more detail an embodiment of an electric variable transmission according to the invention.

FIG. 2 schematically shows a more practical makeup of the EVT in FIG. 1. In this embodiment, the secondary induction machine 6 has been built around the primary induction machine 4. In the housing 3, from the centerline, in succession, the slip ring armature 8, the primary cage armature 9, the second cage armature 11, and the stator 10 have been arranged concentrically relative to each other. The primary and secondary cage armature 9 and 11, respectively, jointly form a hollow interrotor 15. This yields the possibility of letting the primary and the secondary induction machine 4 and 6, respectively, use a part of the flux jointly, so that the yolk between the cage windings can be made of lighter design. To that end, the two cage armatures are not only coupled mechanically, as is the case in the electromagnetic converter in the European patent application EP-A-0 866 544, but also coupled electromagnetically. In the most favorable manner, this has been realized by constructing the two cage armatures 9 and 11 as one integrated whole. The thus obtained interrotor 15 is represented in FIG. 3 and furthermore in FIGS. 4-6, which show a cross section A-A of the rotor, the interrotor and the stator in FIG. 3. The interrotor 15 consists of an electric and a magnetic circuit.

Figure 4:
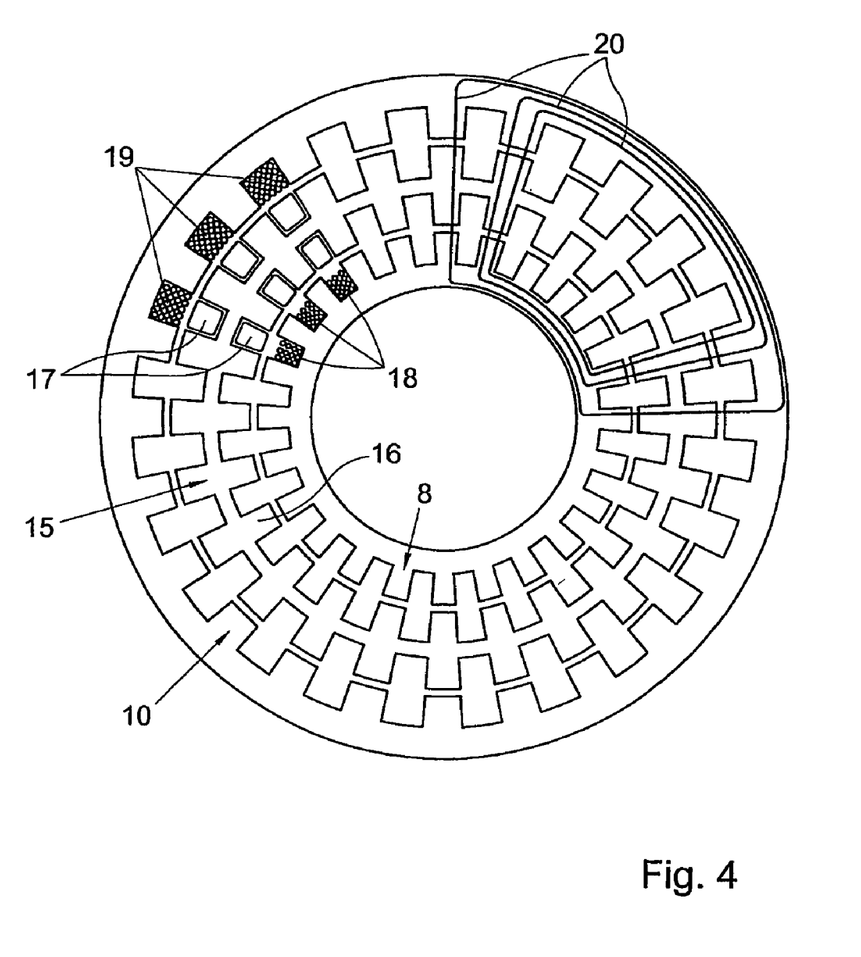
FIGS. 4–6 shows cross sections of a rotor-interrotor-stator combination in the electric variable transmission according to the invention in elucidation of the operation thereof.
Figure 5:
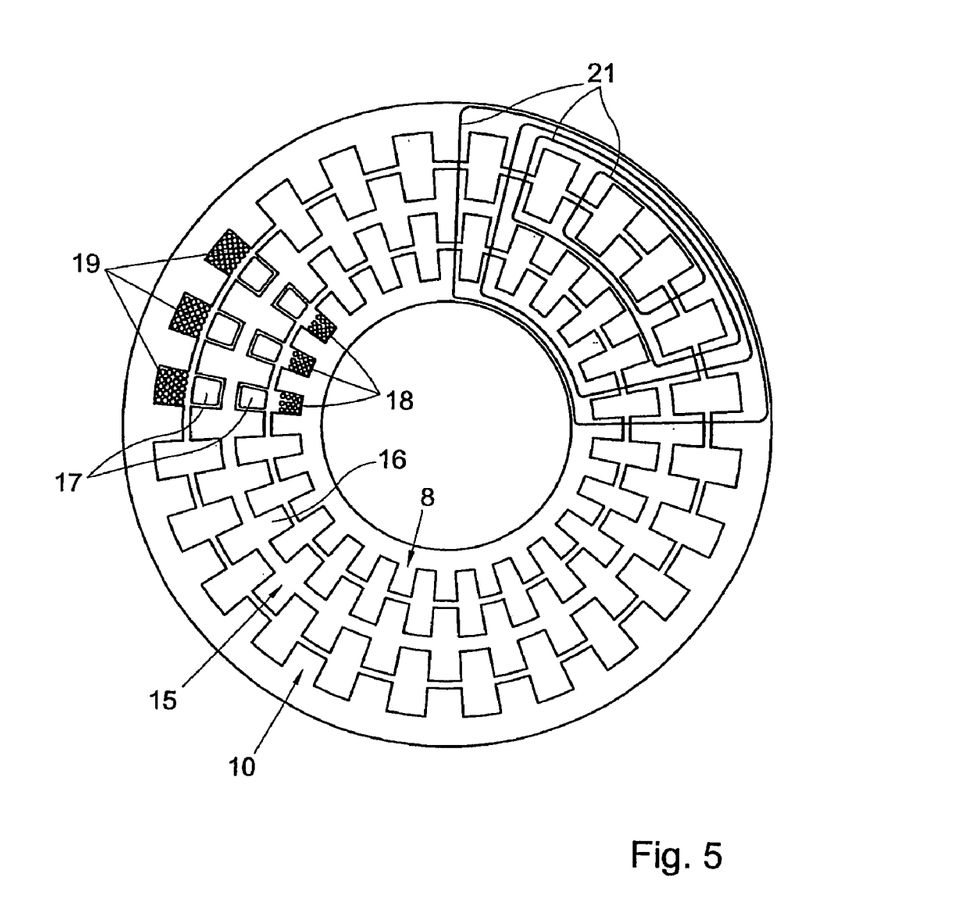
Figure 6:
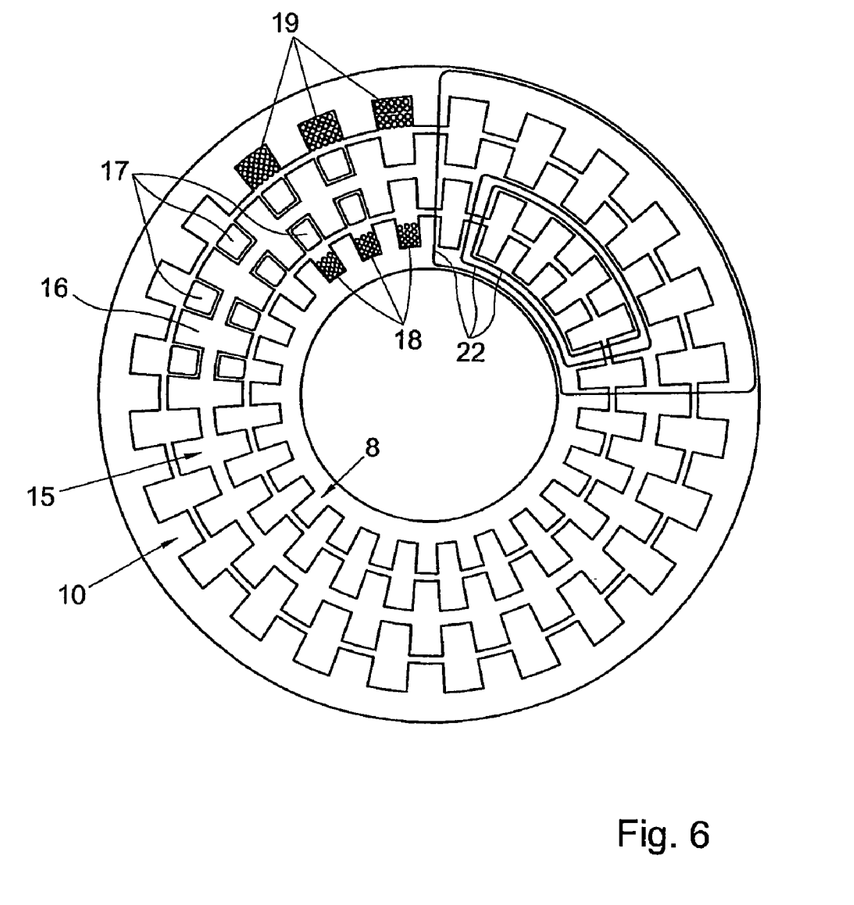

In the embodiment of FIG. 3 and in FIGS. 4–6, the magnetic circuit is formed by a laminated cylinder 16 having on both sides longitudinally extending grooves in which extend the shortcircuit windings 17 forming the electric circuit. In FIGS. 4–6 these windings have been inscribed only at a few places. This last, incidentally, is also true of the rotor and stator winding 18 and 19, respectively, in the grooves in the cylinder of the rotor 8 and the stator 10.

The magnetic flux conducting circuit of the interrotor, here a yolk with teeth between which grooves are located, has a substantially smooth surface on its radial inner side and the radial outer side. The pattern of magnetic poles in the magnetically conducting material of the interrotor can be varied during operation. The rotor, interrotor and stator parts of the electromechanical converter are electromagnetically coupled: flux transfer can take place from the rotor via the interrotor to the stator and vice versa. The interrotor forms one whole both mechanically and electromagnetically. The parts of the electromagnetic transmission are jointly controlled by a single control device.

In the embodiment represented in FIG. 3, the electromechanical converter comprises four poles, while in the FIGS. 4–6, in bold type, for one of these poles a number of magnetic lines have been indicated. FIG. 4 shows a situation which is comparable to a situation that specifically occurs with the EVT in the European patent application EP-A-1 154 551: in the interrotor 15 no conduction in tangential direction but only in radial direction takes place. The associated magnetic field line course is indicated in FIG. 4 by the reference numeral 20. A local magnetic field attenuation in the EVT is not possible; this is only rendered possible in case of a magnetic flux conduction in the interrotor 15 in the tangential direction, as will appear hereinafter and is represented in FIGS. 5 and 6.

FIG. 5 shows a situation which will occur in an EVT according to the invention, for instance when driving off in a vehicle provided with such an EVT. The rotor 8 then initially has a speed ($\omega_{m1}$) which is relatively high with respect to the speed ($\omega_{m2}$) of the interrotor 15. In case of a relatively great value of the speed difference ($\omega_{m1}-\omega_{m2}$) and a particular voltage applied by the primary power electronic converter 12 to the slip rings of the rotor 8, i.e. $U_r=c(\omega_{m1}-\omega_{m2})\Phi_r$, wherein $\Phi_r$ is the magnetic flux generated in the rotor and c is a constant, then in the rotor a relatively weak magnetic flux $\Phi_r$ will be generated. In this case, the magnetic flux does not need to be large because the torque exerted by the rotor 8 on the interrotor 15 does not need to be so either. The rotor 8 then works as a generator for the stator 10, while via the voltage inverters 12 and 13 power is transferred to the stator; then applied to the stator is a relatively high voltage $U_s=c'.\omega_{m2}.\Phi_s$, wherein $\Phi_s$ is the flux generated in the stator and c' is a constant. This means that a relatively strong magnetic flux $\Phi_s$ is generated in the stator, so that in turn a relatively large torque $T_{c2}$ can be transferred to the interrotor 15 and hence to the shaft 7 and the load mounted thereon. The interrotor-stator combination then works as a motor. The magnetic flux in the interrotor-stator combination will then be in saturation. The magnetic field line course in this situation is indicated by 21 in FIG. 5, whereby a tangential flux course occurs in the interrotor 15.

FIG. 6 shows a situation which will occur in an EVT according to the invention in, for instance, the conventional working range of an EVT in a vehicle. The rotor 8 then has a speed ($\omega_{m1}$) which is relatively low with respect to the speed ($\omega_{m2}$) of the interrotor 15. In case of a relatively low value of the speed difference ($\omega_{m1}-\omega_{m2}$) and a particular voltage applied by the primary power electronic converter 12 to the slip rings of the rotor 8, i.e. $U_r=c(\omega_{m1}-\omega_{m2})\Phi_r$, wherein $\Phi_r$ is the magnetic flux generated in the rotor and c is a constant, then in the rotor a relatively strong magnetic flux $\Phi_r$ will be generated, so that the rotor 8 can exert a strong torque on the interrotor 15. In that case, via the voltage inverters 12 and 13, little power is transferred to the stator; applied to the stator 10 is then a relatively low voltage $U_s=c'.\omega_{m2}.\Phi_s$, wherein $\Phi_s$ is the flux generated in the stator and c' is a constant. This means that a relatively weak magnetic flux $\Phi_s$ is generated in the stator, as a result of which then—via the power electronic part 2—a relatively minor torque $T_{c2}$ can be transferred to the interrotor 15 and hence to the shaft 7 and the load mounted thereon. The rotor-interrotor combination here works as a motor. The magnetic flux in the rotor-interrotor combination will then be in saturation. The magnetic field line course in this situation is indicated in FIG. 6 by 22, while again a tangential flux course occurs in the interrotor 15.

In the situation of overdrive, via the voltage inverter 12 and 13 a power transfer from the stator 10 to the rotor 8 takes place. The stator then exerts a relatively minor torque on the interrotor 15. By contrast, a strong torque is exerted by the rotor 8 on the interrotor.

The invention is not limited to the exemplary embodiment described here with reference to FIG. 3 and FIGS. 4–6, but encompasses all kinds of modifications thereon, naturally insofar as these fall within the scope of protection of the following claims. Thus, it is for instance possible to design the interrotor as a magnetic flux conducting cylinder, where on opposite sides thereof permanently magnetic material, for instance in the form of blocks, is arranged. In another possible embodiment, the interrotor is formed by a magnetic flux conducting cylinder, where on one side permanently magnetic material is applied and on the other side longitudinally extending grooves have been provided in which an electrically accessible winding has been arranged. In this latter case, however, it is to be ensured that a current supply point be present on the interrotor 15 or on the secondary shaft 7; on this shaft 7, slip rings can be easily mounted, via which current can be supplied or removed.

The invention claimed is:

1. An electromechanical converter comprising:
   a primary shaft having a rotor mounted thereon;
   a secondary shaft having an interrotor mounted thereon; and
   a stator fixedly mounted to a housing of the electromechanical converter, wherein, viewed from the primary shaft in a radial direction, the rotor, the interrotor, and the stator are arranged concentrically relative to each other, and wherein the rotor and the stator comprise one or more windings, and wherein the interrotor comprises one whole both mechanically and electromagnetically, and the interrotor further comprises a magnetic and an electric circuit, the magnetic circuit including a magnetic flux conducting cylinder and the electric circuit including a number of electric circuit-forming windings extending in the flux conducting cylinder, and wherein the interrotor is arranged as a conductor for the magnetic flux in a tangential and a radial direction so that exertion of a direct torque between rotor and stator can occur upon magnetic saturation of the interrotor.

2. The electromechanical converter according to claim 1, characterized in that the interrotor comprises an electric and a magnetic circuit, and the magnetic circuit comprises a cylinder having two sides, with both sides defining longitudinally extending grooves in which electric circuit-forming shortcircuit windings extend.

3. The electromechanical converter according to claim 1, characterized by the interrotor being formed by a magnetic flux conducting cylinder, and the electromechanical converter further comprises:
  permanently magnetic material applied on a first side of the interrotor; and
  longitudinally extending grooves associated with a second side of the interrotor in which an electrically accessible winding is provided.

4. The electromechanical converter according to claim 1, characterized by the stator winding and rotor winding being mutually connected with each other via one or more power electronic converters.

5. The electromechanical converter according to claim 4, characterized by said one or more power electronic converters being electrically accessible via an electric gate.

6. The electromechanical converter according to claim 1, characterized in that the stator winding and rotor winding are separately accessible through a power electronic converter and an electric gate.

7. An apparatus provided with an electromechanical converter according to claim 1.

8. An apparatus provided with an electromechanical converter according to claim 1, wherein the apparatus is selected from the group consisting of an apparatus for starting a driving combustion engine and an apparatus for supplying electrical equipment.

9. The apparatus provided with an electromechanical converter according to claim 7, further comprising a system for the storage of energy.

* * * * *